US012658359B2

(12) United States Patent
Salinas et al.

(10) Patent No.: US 12,658,359 B2
(45) Date of Patent: Jun. 16, 2026

(54) POWER TRANSFORMER

(71) Applicant: Hitachi Energy Ltd, Zürich (CH)

(72) Inventors: Ener Salinas, Västerås (SE); Orlando Girlanda, Västerås (SE); Gunnar Russberg, Västerås (SE); Goran Eriksson, Västerås (SE); Manoj Pradhan, Västerås (SE)

(73) Assignee: Hitachi Energy Ltd, Zürich (CH)

( * ) Notice: Subject to any disclaimer, the term of this patent is extended or adjusted under 35 U.S.C. 154(b) by 784 days.

(21) Appl. No.: 18/023,042

(22) PCT Filed: Jun. 7, 2021

(86) PCT No.: PCT/EP2021/065170
§ 371 (c)(1),
(2) Date: Feb. 24, 2023

(87) PCT Pub. No.: WO2022/073658
PCT Pub. Date: Apr. 14, 2022

(65) Prior Publication Data
US 2023/0317365 A1 Oct. 5, 2023

(30) Foreign Application Priority Data

Oct. 6, 2020 (EP) ..................................... 20200288

(51) Int. Cl.
*H01F 27/40* (2006.01)
*H01F 27/12* (2006.01)
(Continued)

(52) U.S. Cl.
CPC ............. *H01F 27/40* (2013.01); *H01F 27/12* (2013.01); *H01F 27/2823* (2013.01); *H01F 27/306* (2013.01); *H02J 50/001* (2020.01)

(58) Field of Classification Search
CPC ...... H01F 27/40; H01F 27/12; H01F 27/2823; H01F 27/306; H01F 27/36; H01F 27/363;
(Continued)

(56) References Cited

U.S. PATENT DOCUMENTS 10,014,091 B2 7/2018 Lopez Gomez et al.
2007/0115700 A1 5/2007 Springett
(Continued)

FOREIGN PATENT DOCUMENTS

CN 1988071 A 6/2007
CN 109087780 A 12/2018
(Continued)

OTHER PUBLICATIONS

International Search Report and Written Opinion of the International Searching Authority, PCT/EP2021/065170, mailed Jul. 14, 2021, 14 pages.
(Continued)

*Primary Examiner* — Tszfung J Chan
(74) *Attorney, Agent, or Firm* — Sage Patent Group

(57) ABSTRACT

A power transformer, including a core and a winding is provided. The core includes a limb and a yoke. The winding is wound around the limb and has an extension along a main axis of the limb. The power transformer further includes an energy harvesting device coupled to at least one of the core or the winding. The energy harvesting device includes a ferromagnetic part and a coil wound around at least a portion of the ferromagnetic part. The energy harvesting device is arranged in such a way that a part of a magnetic flux MF generated in the power transformer induces an electromotive force in the energy harvesting device. The coil includes a wire wound around a main axis of the coil and has an extension along the main axis of the coil.

9 Claims, 8 Drawing Sheets

(51) Int. Cl.
　　H01F 27/28 (2006.01)
　　H01F 27/30 (2006.01)
　　H02J 50/00 (2016.01)

(58) Field of Classification Search
　　CPC .......... H01F 27/402; H01F 38/28; H01F 3/12;
　　　　　　　H01F 27/08; H01F 27/085; H01F 27/38;
　　　　　　　H01F 27/42; H01F 30/12; H01F 38/30
　　USPC .............. 336/55, 57, 58, 212, 214, 215, 221
　　See application file for complete search history.

(56) References Cited

U.S. PATENT DOCUMENTS

| | | | | |
|---|---|---|---|---|
| 2008/0303619 | A1* | 12/2008 | Viitanen | ................... H01F 3/14 |
| | | | | 336/110 |
| 2012/0092114 | A1 | 4/2012 | Matthews | |
| 2013/0049751 | A1* | 2/2013 | Hamberger | ......... G01R 33/072 |
| | | | | 324/253 |
| 2017/0089986 | A1* | 3/2017 | Hamberger | ........... H01F 27/085 |
| 2018/0033545 | A1* | 2/2018 | Schrammel | ............. H01F 27/10 |
| 2020/0286675 | A1* | 9/2020 | Liang | .................. H01F 27/2804 |

FOREIGN PATENT DOCUMENTS

| | | |
|---|---|---|
| CN | 108335850 B | 10/2019 |
| EP | 1783788 A2 | 5/2007 |
| EP | 2952997 A1 | 12/2015 |
| JP | H02229410 A | 9/1990 |
| JP | H1140429 A * | 2/1999 |
| JP | 2015004572 A * | 1/2015 |
| WO | 2010125573 A2 | 11/2010 |

OTHER PUBLICATIONS

Chee, Y-H., et al., "PicoCube: A 1cm3 Sensor Node Powered by Harvested Energy," UC Berkeley, Energy Use in Buildings Enabling Technologies, Jun. 8-13, 2008, 7 pages.

Bhuiyan, R., "A Miniature Energy Harvesting Device for Wireless Sensors in Electric Power System," IEEE Sensors Journal, vol. 10, Issue 7, 2010, 12 pages,.

Gilbert, J. M., "Comparison of Energy Harvesting Systems for Wireless Sensor Networks," International Journal of Automation and Computing, 05(4), Oct. 2008, 14 pages.

Extended European Search Report, EP20200288.7, mailed Mar. 18, 2021, 11 pages.

Office Action, Chinese Patent Application No. 202180067659.7, mailed Sep. 1, 2023, 7 pages.

Notice of Grounds for Rejection, Korean Patent Application No. 10-2023-7011223, mailed May 13, 2023, 11 pages.

* cited by examiner

POWER TRANSFORMER

CROSS REFERENCE TO RELATED APPLICATIONS

This application is a 35 U.S.C. § 371 national stage application of PCT International Application No. PCT/EP2021/065170 filed on Jun. 7, 2021, which in turn claims foreign priority to European Patent Application No. 20200288.7, filed on Oct. 6, 2020, the disclosures and content of which are incorporated by reference herein in their entirety.

BACKGROUND

The present disclosure relates to a power transformer and, more particularly, to a power transformer having an energy harvesting device.

A power transformer-herein also denominated simply as "transformer"—is a passive electrical device that transfers electrical energy from one electrical circuit to another, or to multiple circuits. The transformer typically comprises a ferromagnetic core having limbs extending between a first yoke and a second yoke. Coils are wound around the limbs. A varying current in any one of the coils produces a varying magnetic flux in the core, which induces a varying electromotive force across any other coil wound around the core.

In order to operate a transformer reliably, it is known to monitor its physical condition. This is typically realized by measuring relevant parameters such as e.g., temperature, humidity, or pressure in a continuous way. It is known to use corresponding sensors for these measurements arranged within a housing or tank of the power transformer, e.g., attached to the core or the coil. These sensors are powered by external power sources. However, there is a general problem to power the sensors, particularly when the transformer is enclosed and embedded in an oil which is filled in a tank, i.e., in the case of an oil-filled transformer. A powering of the sensors by use of cables in such a case requires providing holes in various parts of a cover or of the tank or housing of the transformer. Such holes implicate the risk of oil leaking, seriously compromising the reliability of the transformer. Trying to power the sensors wirelessly from the exterior of the tank or housing of the transformer may be difficult since the tank or housing functions as a shield. If power is needed for further purposes, such as e.g., oil circulation, the latter hindrances also arise.

There is a need to provide improved techniques for operating a power transformer. There is particularly a need for techniques for operating an oil-filled power transformer with increased reliability. These objects are achieved by the independent claim. Dependent claims refer to some embodiments.

SUMMARY

According to the present disclosure a power transformer, comprising a core and a winding is provided. The core comprises a limb and a yoke. The core may comprise at least one limb or a plurality of limbs, e.g., two limbs or three limbs. The core may comprise at least one yoke, e.g., two yokes. The winding is wound around the limb and has an extension along a main axis of the limb. The power transformer further comprises an energy harvesting device coupled to at least one of the core or the winding. The energy harvesting device comprises a ferromagnetic part and a coil wound around at least a portion of the ferromagnetic part.

The energy harvesting device is arranged in such a way that a part of a magnetic flux generated in the power transformer induces an electromotive force in the energy harvesting device. In other words, the energy harvesting device is arranged in such a way that a part of a magnetic flux generated in the power transformer can be captured using the ferromagnetic part. The coil comprises a wire wound around a main axis of the coil and has an extension along the main axis of the coil which is less than the extension of the winding.

A real transformer in an operational state shows a nonzero yet small leaking or stray magnetic flux. This happens primarily near regions where the flux "bends" or where there is a transition between a winding and the ferromagnetic core. This flux is minimal when the transformer is well designed, however, it is enough for allowing the energy harvesting device to extract a small quantity of electric energy to power e.g. an auxiliary electric device requiring such energy for a continuous functioning or e.g., for recharging a small battery for the same purpose-without practically influencing the functioning or efficiency of the transformer. In this manner, the energy harvesting device particularly allows for providing energy for operating an auxiliary electric device of the power transformer, such as a sensor or an oil pump arranged within a housing or a tank of the power transformer. The energy harvesting device thus makes it possible to use energy from the magnetic flux generated in the power transformer for powering the auxiliary device. For this reason, no cables across a housing or a tank of the power transformer are necessary for powering the auxiliary device. Thus, the risk of oil leaking, seriously compromising the reliability of the transformer may be eliminated or significantly reduced. Therefore, reliability of the power transformer may be improved.

Various embodiments may preferably implement the following features:

In some embodiments, the energy harvesting device has a first end portion attached to the limb and a second end portion attached to the yoke. Thus, it is possible to "pull" or "extract" a small quantity of magnetic flux from a border of the yoke.

In some embodiments, the limb is connected with one end to the yoke and with a second, opposing end to a further yoke of the core.

There are as well other possible advantageous locations to place the harvester:

In some embodiments, the core includes an aperture, wherein the energy harvesting device is arranged at least partially within the aperture.

In some embodiments, the energy harvesting device is arranged on an upper surface of the core or at an edge of the core. In some embodiments, the energy harvesting device is arranged in an inner edge of the core.

In some embodiments, the extension of the coil is less than 10%, or less than 5%, or less than 2% of the extension of the winding. Thus, it is possible to use a leaking flux, a stray flux or an extremely tiny flux while reducing the risk that the energy harvesting device influences the functionality of the transformer to an undesired degree.

In some embodiments, the main axis of the coil is at least essentially oriented parallel to a local vector of the magnetic flux within the ferromagnetic part of the energy harvesting device. For example, the energy harvesting device may be arranged on a surface area of the limb or of the winding, having a local normal vector oriented perpendicular to the main axis of the limb, wherein the main axis of the coil is oriented parallel to the main axis of the limb. Similarly, the energy harvesting device may be arranged on a surface area of the winding having a local normal vector parallel to the main axis of the limb (i.e., if the limb is oriented vertical, for example an upper facing top surface of the winding), wherein the main axis of the coil is oriented parallel to the main axis of the limb.

In some embodiments, the power transformer further comprises a tank filled with oil, wherein the core and the winding are at least partially submerged in the oil.

In some embodiments, the ferromagnetic part includes or consists of laminated silicone steel. Alternatively or additionally, the ferromagnetic part may include or consist of ferrite, of a nanocrystalline material or of another material.

In some embodiments, the coil includes a copper wire.

In some embodiments, the copper wire has a diameter of 0.1 mm or less.

In some embodiments, the ferromagnetic part is attached to the core via at least one permanent magnet. Thus, the energy harvesting device can be attached easily and robustly.

In some embodiments, the permanent magnet includes Neodymium or consists of Neodymium.

In some embodiments, the energy harvesting device is designed and arranged to power an auxiliary electric device of the transformer, for example a sensor for sensing temperature and/or humidity and/or pressure.

In some embodiments, the auxiliary electric device is disposed within the tank, preferably submerged in oil.

In some embodiments, the power transformer is a 50/60 Hz power transformer.

BRIEF DESCRIPTION OF THE DRAWINGS

The subject-matter of the disclosure will be explained in more detail with reference to some embodiments which are illustrated in the attached drawings, in which.

DETAILED DESCRIPTION

Example embodiments of the disclosure will be described with reference to the drawings in which identical or similar reference signs designate identical or similar elements. The features of embodiments may be combined with each other, unless specifically noted otherwise.

Figure 1:
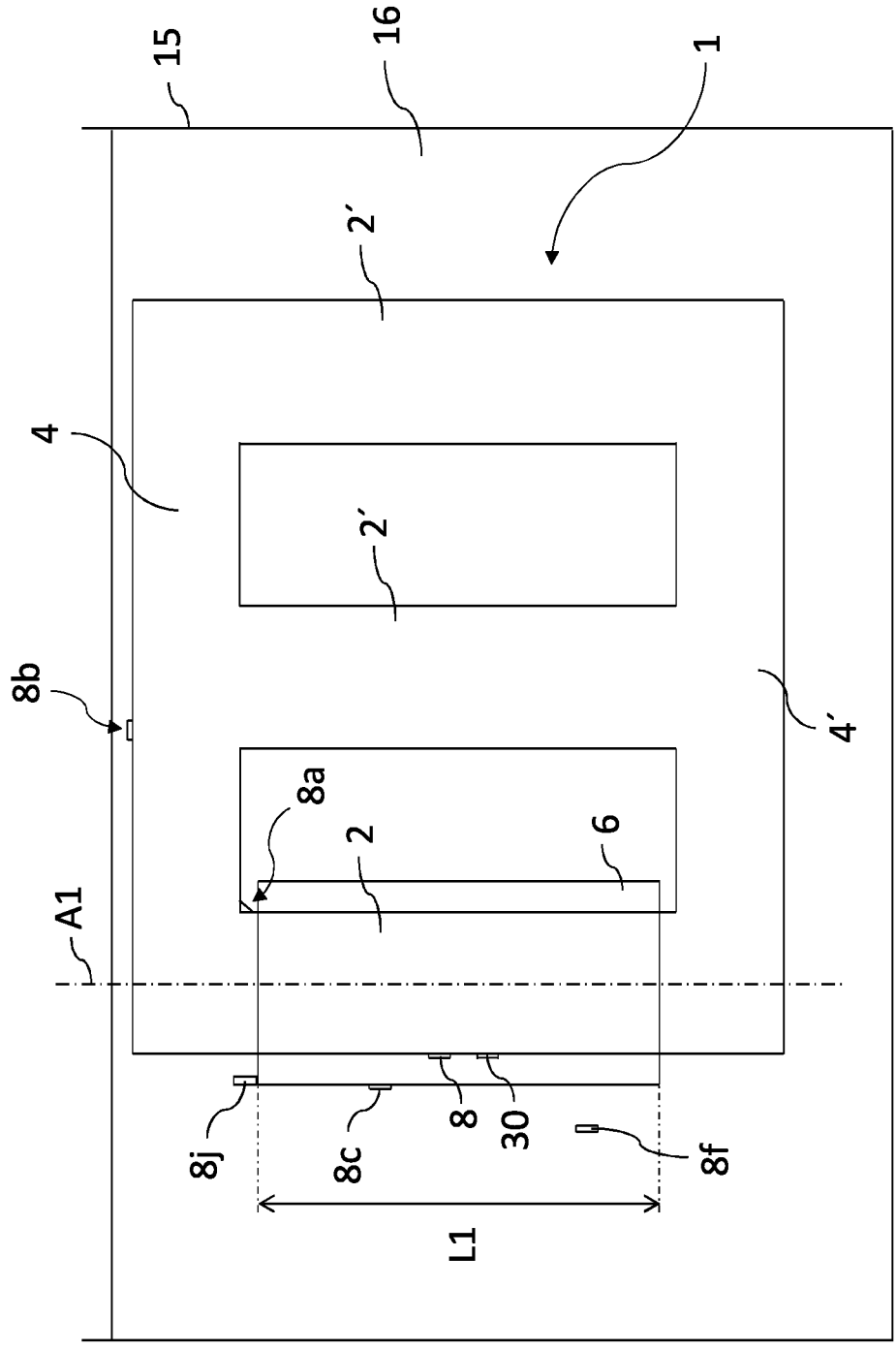
FIG. 1 is a schematic frontal view of a transformer according to the disclosure comprising limbs and yokes, wherein an energy harvesting device is attached to one of the limbs.

FIG. 1 is a schematic front view of a transformer according to the disclosure. The transformer, for example a 50/60 Hz power transformer comprises a core 1 having a limb 2 and a yoke 4. The transformer may have at least one further limb 2' and a further yoke 4'. However, it is understood by the skilled person that the power transformer is not limit to any specific frequency and in particular higher frequencies may be well possible. The limb 2 is elongate defining a main axis A1. The limb 2 may be connected with one end to the yoke 4 and with a second, opposing end to the further yoke 4".

The transformer further comprises a winding 6 wound around the limb 2. The winding 6 has an extension L1 measured along the main axis A1 of the limb 2.

The transformer may further comprise a tank 15 filled with oil 16, wherein the core 1 and the winding 6 are at least partially submerged in the oil 16.

Figure 2:
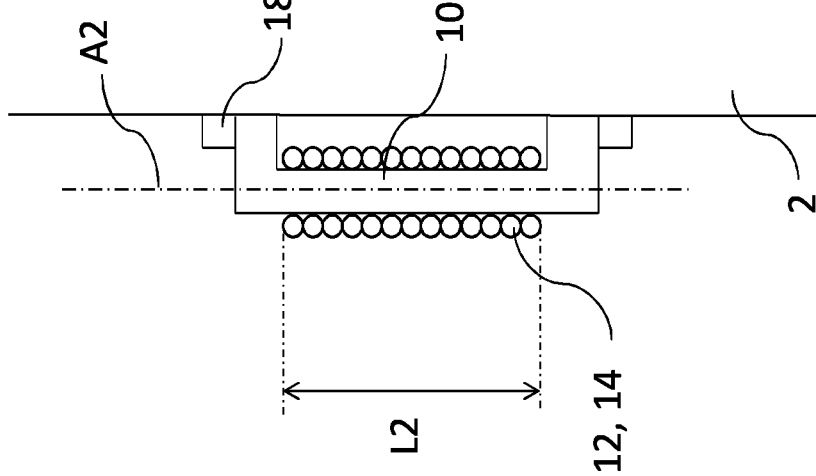
FIG. 2 shows a detail of FIG. 1 around the energy harvesting device.
Figure 2:

The transformer further comprises an energy harvesting device 8 coupled to at least one of the core 1 or the winding 6, for example, as exemplarily illustrated to the limb 2. FIG. 2 shows the energy harvesting device 8 in more detail. The energy harvesting device 8 comprises a ferromagnetic part 10 and a coil 12 wound around at least a portion of the ferromagnetic part 10. The coil 12 comprises a wire 14 wound around a main axis A2 of the coil 12.

The ferromagnetic part 10 may include or may consist of laminated silicone steel (SiFe). Alternative materials are, for example, ferrite and a nanocrystalline material. The coil 12 may have a large number of turns, for example, several thousand turns wounded with the wire 14. The wire 14 may be for example a copper wire, preferably having a diameter of 0.1 mm or less.

The energy harvesting device is designed and arranged in such a way that a part of a magnetic flux generated in the power transformer induces an electromotive force in the energy harvesting device. Thus, a part of the magnetic flux generated in the power transformer can be captured using the ferromagnetic part. For example, the energy harvesting device may be attached to the core 1 or to the winding 6. However, the energy harvesting device is not necessarily attached to the core 1 or the winding 6. It may be alternatively positioned having a distance to the core 1 and the winding 6. The distance may be, for example, between 1 mm and 10 cm.

Again referring to FIG. 2, the coil 12 of the energy harvesting device 8 has an extension L2 measured along the main axis A2 of the coil 12, which is less than the extension L1 of the winding 6 wound around the limb 2. In some embodiments, the extension L2 of the coil 12 is less than 10%, or less than 5%, or less than 2% of the extension L1 of the winding (6).

Figure 7:
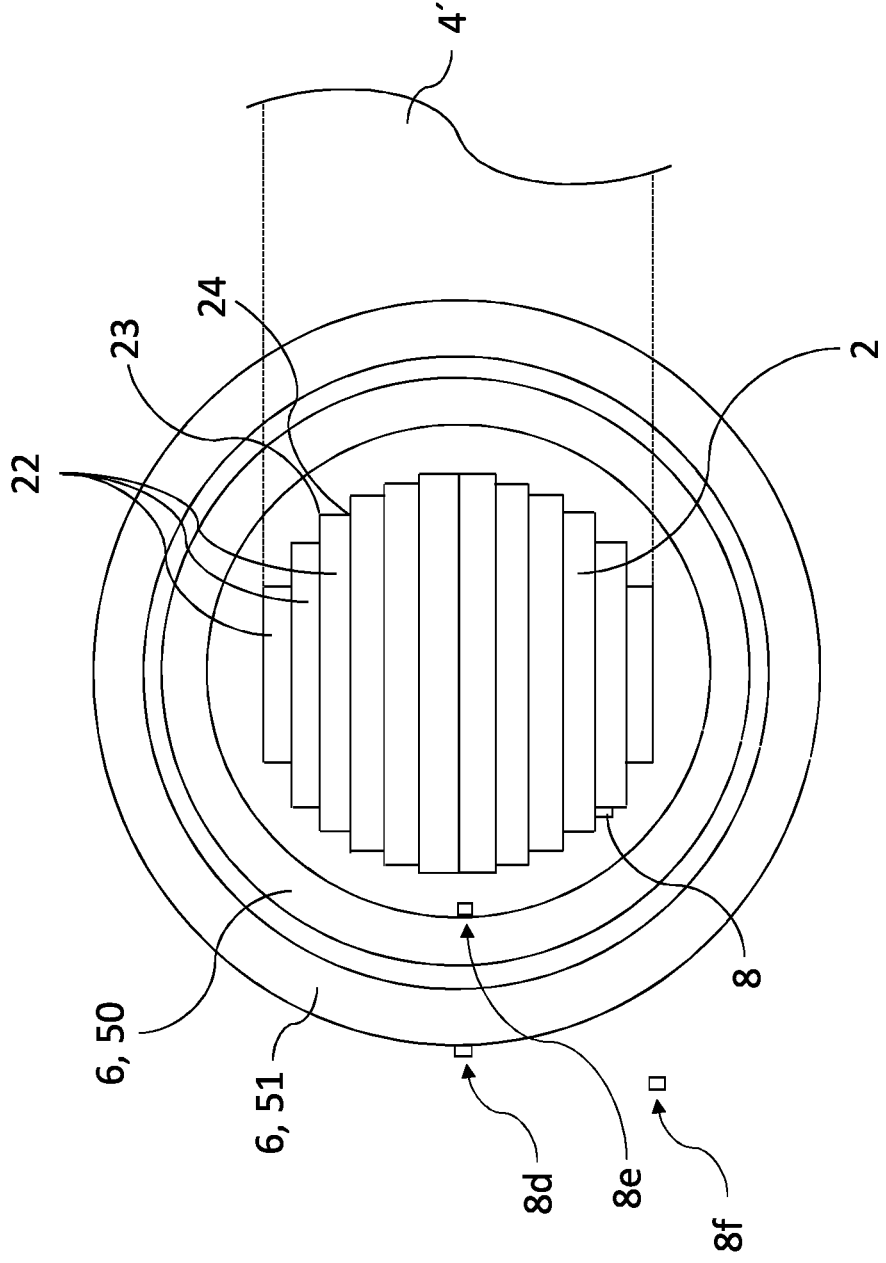
FIG. 7 shows a sketch of a cross-sectional view through a limb of the core and a winding wound around the limb, illustrating exemplarily several further possible positions of an energy harvesting device.

As illustrated in FIG. 7, which shows a sketched cross-sectional view through the limb 2 and its winding 6, the limb 2 may comprise, laminations 22 which form, due to the thickness of the laminations, linear inner edges 24 and linear outer edges 23 oriented parallel to the main axis A1 of the limb 2. Advantageously, the energy harvesting device 8 may be disposed in an inner edge between two outer edges adjacent to the inner edge. Analogously, as sketched in FIG. 5*a*, the yoke 4 may comprise laminations 41, forming linear inner edges 43 and linear outer edges 42 extending parallel to a main axis of the yoke 4, wherein the energy harvesting device, here indicated by reference sign 8*h*, is disposed in an inner edge 43.

Again referring to FIG. 1, the energy harvesting device may be alternatively arranged on a planar section of a surface of the core 1, for example on an upper surface of the yoke 4, as sketched in FIG. 1 by reference sign 8*b*. Further alternatively, as already mentioned above, the energy harvesting device may be arranged on a surface of the winding 6, as sketched in FIG. 1 by reference sign 8*c*. As illustrated in FIG. 7, the winding 6 may comprise for example an inner winding 50 and an outer winding 51. The energy harvesting device may be e.g., attached to an outer or inner surface of the outer or inner winding 51, 50. FIG. 7 illustrates an example of an energy harvesting device 8*d* disposed on an outer surface of the outer winding 51 and an energy harvesting device 8*e* disposed on an inner surface of the inner winding 50. The energy harvesting device may be, for example, adhesively attached to the winding 6, e.g., using adhesive tape or glue. In such a case, further attachment, e.g., using a permanent magnet is not necessary for holding the energy harvesting device.

Figure 5B:
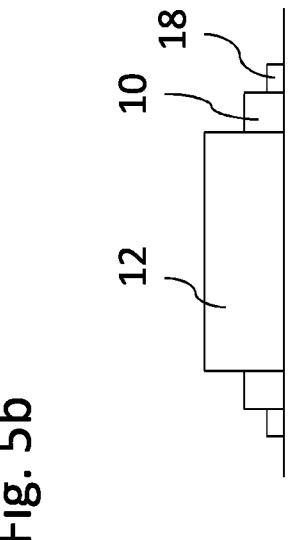
FIGS. 5*a* and 5*b* illustrate an energy harvesting device attached in an inner edge of a yoke of a transformer.
Figure 5A:
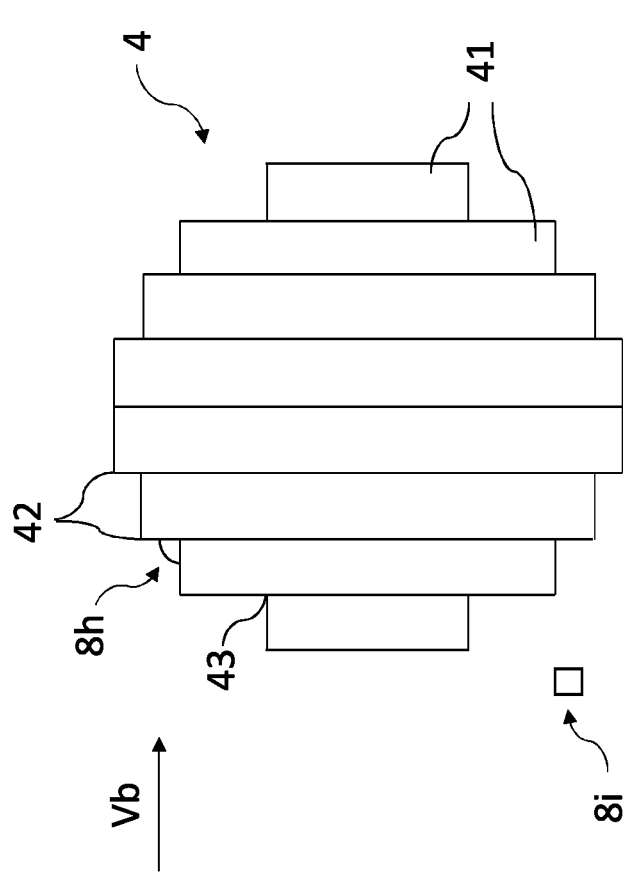

As exemplarily indicated in FIGS. 1 and 7 by reference sign 8*f*, the energy harvesting device may be positioned having a distance to the core 1 and to the winding 6, i.e. disposed unbound. In such a case, the energy harvesting device may be for example attached to a part of a housing of the transformer. FIG. 5*a* illustrates a further possible energy harvesting device 8*i* having a distance from the yoke 4 and the winding (not illustrated in FIG. 5*a*).

Again with reference to FIG. 2, the ferromagnetic part 10 and the coil 12 allow for "bridging" or "channeling" the varying magnetic flux generated in the transformer and to generate, by Faraday's induction law, a voltage proportional to N A dB/dt, where B indicates the magnetic flux density passing through a cross sectional area A of the ferromagnetic part 10, and N the winding number of the turns of the coil 12 of the energy harvesting device 8. Accordingly, the main axis A2 of the coil 12 of the energy harvesting device is preferably oriented at least essentially parallel to the local direction of the magnetic flux generated in the power transformer.

The ferromagnetic part 10 may be e.g., made of a laminated silicon steel (SiFe).

The ferromagnetic part 10 of the energy harvesting device 8 may be attached to the core or to the winding for example via an adhesive. Alternatively or additional, the ferromagnetic part 10 may be attached to the core 1, for example to the limb 2 or the yoke 4 via at least one permanent magnet 18, preferably including or consisting of Neodymium. This allows for a robust attachment of the energy harvesting device 8 to the core 1 such that it will be kept in place for an entire lifespan of the transformer. Moreover, such an attachment can be easily established while assembling the transformer.

As sketched in FIG. 1, the transformer may comprise an auxiliary electric device 30, for example a sensor, an oil pump, or a rechargeable battery, wherein the auxiliary electric device is powered by the energy harvesting device 8. The sensor may be a sensor for sensing temperature and/or humidity and/or pressure.

The auxiliary electric device 30 may be disposed nearby the energy harvesting device 8, for example within the tank 15, and in some embodiments may be submerged in the oil. The auxiliary electric device 30 may be attached to the core 1 or to the winding 4. However, the auxiliary device 30 may be also disposed elsewhere, for example on an inner surface of the tank 15.

During assembly, the energy harvesting device 8 may be attached to the limb 2 before the winding 6 wound around the limb 2 is mounted.

Figure 3:
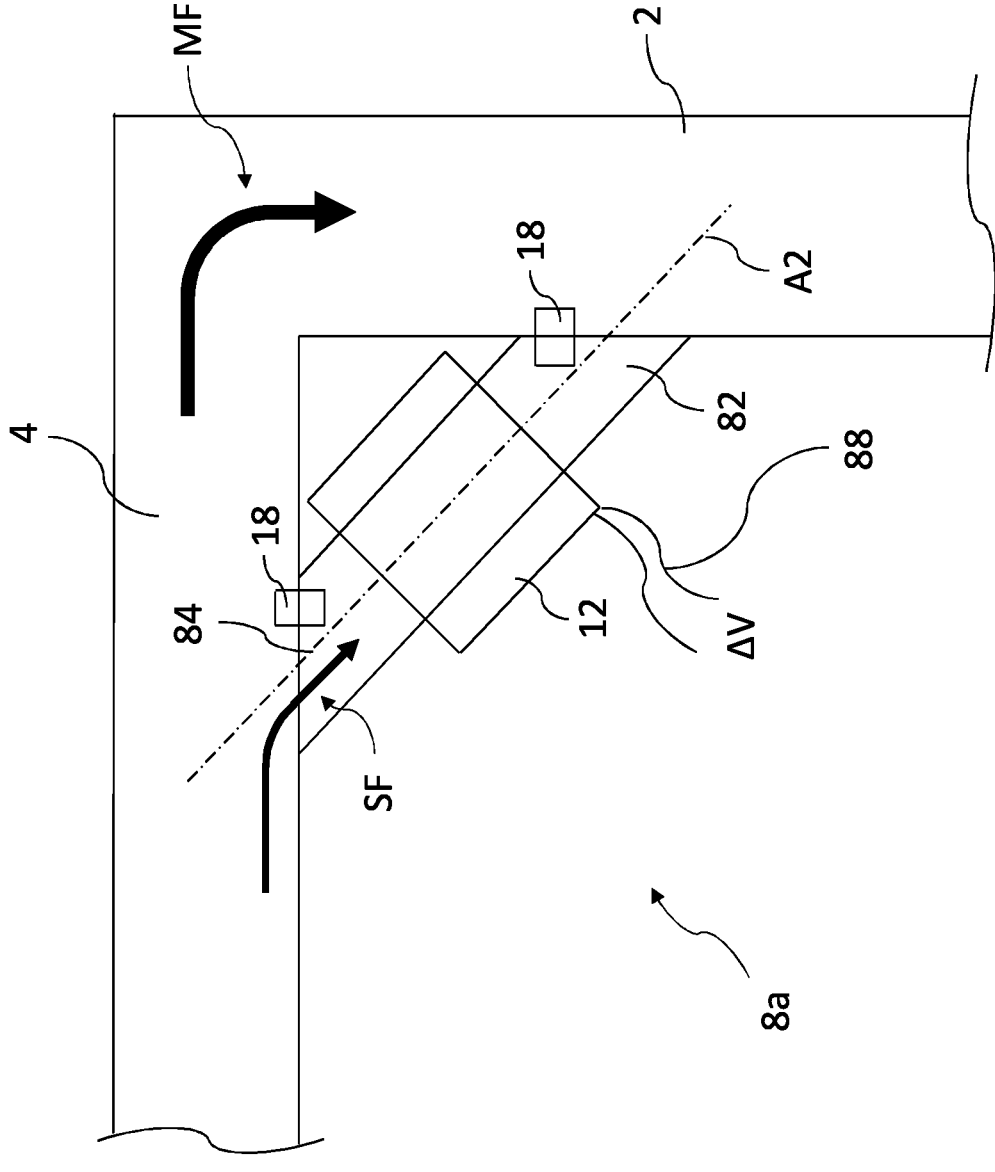
FIG. 3 is a schematic view of an energy harvesting device arranged at a corner formed by a yoke and a limb of a transformer.

FIG. 3 illustrates an alternative design of the energy harvesting device, here designated also by 8*a*. According to this embodiment, the energy harvesting device 8*a* has a first end portion 82 attached to the limb 2 and a second end portion 84 attached to the yoke 4. The position is also sketched in FIG. 1. In some embodiments, the first end portion 82 and the second end portion 84 are opposing to each other seen along the main axis A2 of the coil 12. Regarding FIG. 3, please note that this drawing is not a scaled drawing. In some embodiments, the diameter of the energy harvesting device 8*a* normal to the main axis 2 of the coil 12 is much less than a normal diameter of the limb 2 or the yoke 4.

FIG. 3 shows a thick bended arrow indicating the magnetic flux MF generated in the transformer and a thinner arrow, less bended, indicating a leaking or stray flux SF of the magnetic flux MF. The energy harvesting device 8*a* is designed and arranged in such a way that a part of the magnetic flux MF generated in the power transformer can be captured using the ferromagnetic part 10 of the energy harvesting device 8*a*. A main portion of the magnetic flux MF is located within the core 1, whereas the stray flux SF "flowing" through the energy harvesting device 8*a* is much smaller than the magnetic flux MF. This can be advantageously achieved if the extension L2 of the coil 12 is less than 10%, or less than 5%, or less than 2% of the extension L1 of the winding 6, as already mentioned above.

Therefore, the magnetic flux MF and by this way the functioning of the transformer is in practice not undesirably compromised by the energy harvesting device. In other words, the stray flux is only a negligible portion of the normal core magnetic flux MF.

The energy harvesting device may be connected electrically to the auxiliary device 30 by connecting cables 88.

In some embodiments, one magnet 18 is arranged to attach the energy harvesting device 8*a* to the limb 2, whereas a further magnet 18 is arranged to attach the energy harvesting device 8*a* to the yoke 4.

Figure 4:
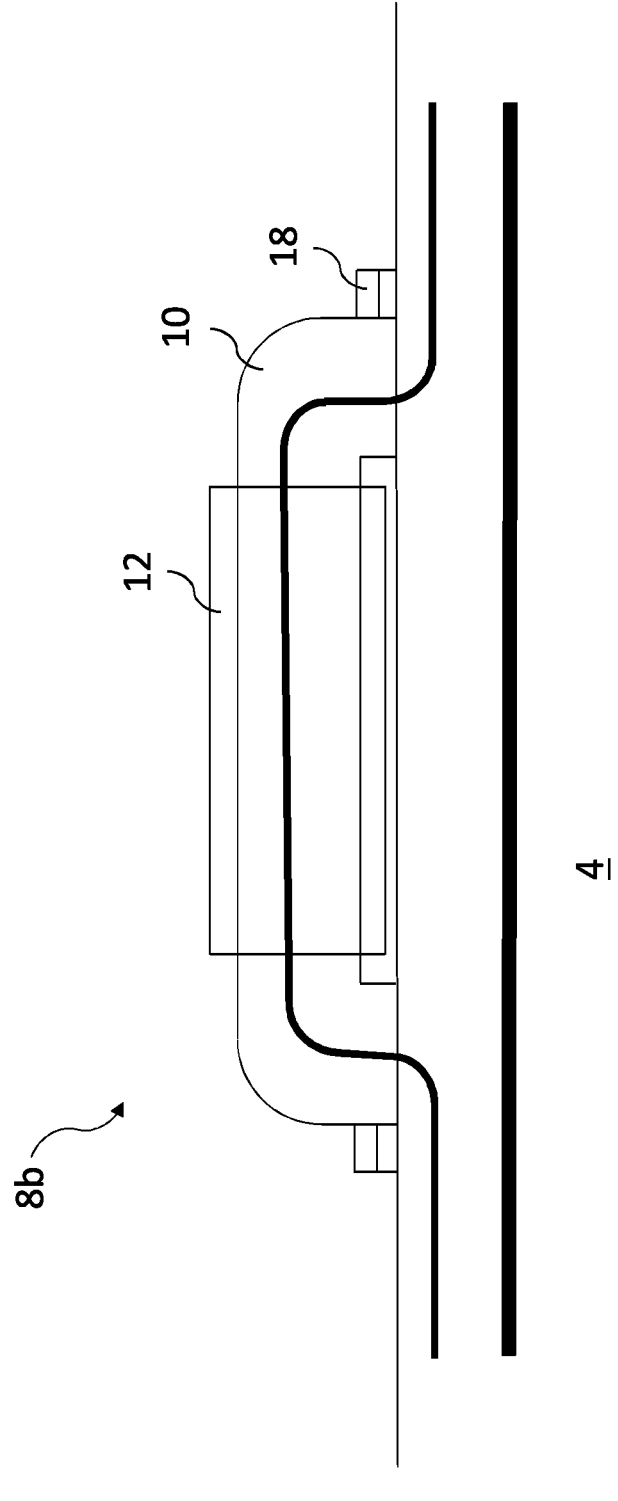
FIG. 4 is a schematic view of an energy harvesting device attached to a surface of a core of a transformer.

FIG. 4 illustrates a further alternative energy harvesting device, here also designated by 8*b*. According to this embodiment, the energy harvesting 8*b* is disposed on an upper surface of the core 1, here of the yoke 4. The position is also sketched in FIG. 1 as already mentioned above. The magnets 18 are placed to attach the energy harvesting device 8*b* to the yoke 4. The energy harvesting device can analogously be attached to an outer surface of the limb 2.

As schematically indicated by the thick line and the thin line, the energy harvesting device "pulls" flux lines from the border of the core 1. The magnets 18 are placed to locally attach the energy harvesting device 8*b* to the core 1, here to the yoke 4.

As already mentioned above, FIG. 5*a* illustrates an energy harvesting device 8*h* positioned in an inner edge 43 of a laminated yoke 4. FIG. 5*b* shows a sketched view of the energy harvesting device 8*h* along viewing direction Vb indicated in FIG. 5*a*.

Figure 6:
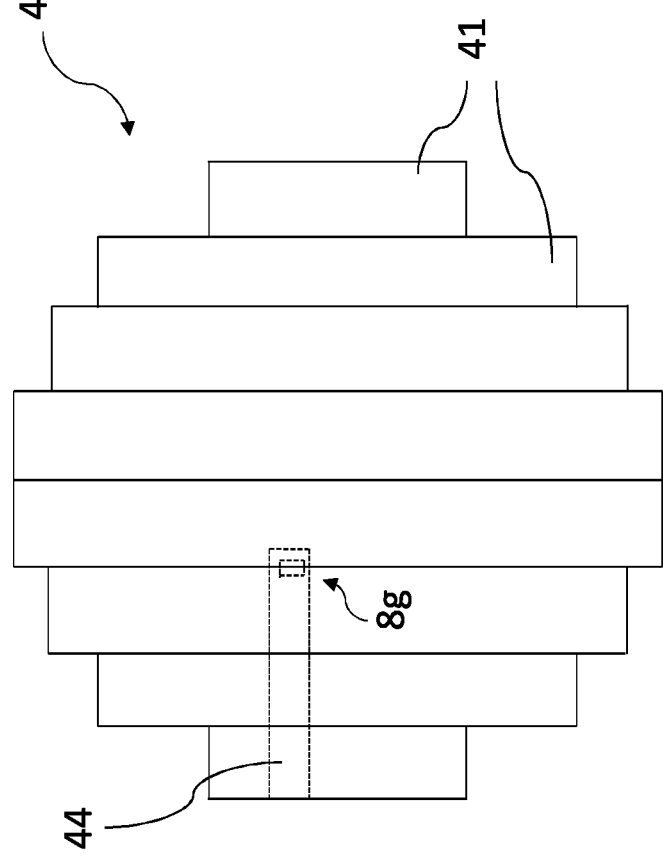
FIG. 6 illustrate an energy harvesting device inserted into a hole formed in a yoke of a transformer.

In FIG. 6, an energy harvesting device 8*g* is placed in a hole 44 formed in the yoke 4. The hole 44 may be drilled. In such a case, the field lines of the magnetic flux are particularly efficiently used since the tiny flux crossing the coil 12 is generally larger as compared to a case where the energy harvesting device is positioned in an inner edge of the core 1 or on a surface of the core 1. The hole 44 may be sealed, e.g., by epoxy, wherein the connecting cables (not illustrated in FIG. 6) lead to the outside.

Figures 8A, 8B:
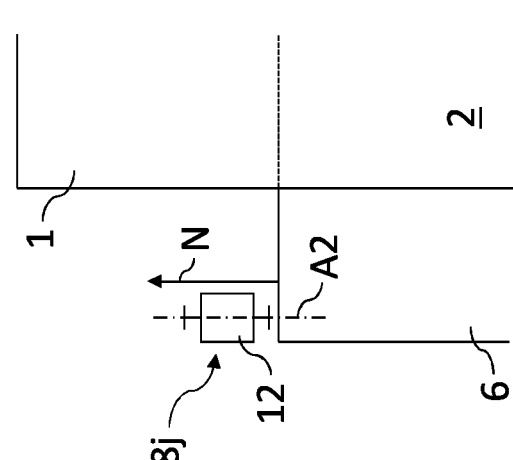
FIG. 8*a* is an enlarged view of FIG. 1 around a further possible position of an energy harvesting device on a top surface of a winding near an outer edge.
FIG. 8*b* shows a corresponding top view.

FIG. 8*a* shows an enlarged view of a further possible position of the energy harvesting device, here indicted by 8*j*. FIG. 8*b* shows a corresponding top view. The energy harvesting device 8*j* is arranged near an outer edge on an end surface of the winding 6, for example—when the limb 2 is oriented vertical-on an upper facing top surface of the winding 6. The energy harvesting device 8*j* is arranged on a surface area having a normal vector N that is oriented parallel to the main axis A1 of the limb 2. The main axis A2 of the coil 12 is oriented as well parallel to the main axis A1 of the limb 2. This is advantageous regarding the efficiency of the energy harvesting device 8*j*, as outlined above.

The energy harvesting device allows for providing enough power to operate an auxiliary device 30 such as for example a sensor or even an array of sensors, e.g., digital or analog sensors. The connecting cables 88 between the energy harvesting device 8 and the auxiliary device 30 can be designed and arranged such that they do in practice not hinder the electric field of the transformer. The energy harvesting device 8 is advantageously positioned such that an impact to the magnetic field is minimal. Possible positions or locations are sketched in FIG. 1, as described above.

While the invention has been described in detail in the drawings and forgoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A power transformer, comprising a core, wherein the core comprises a limb and a yoke;
    a winding wound around the limb, wherein the winding has an extension along a main axis of the limb;
    an energy harvesting device comprises a ferromagnetic part and a coil wound around at least a portion of the ferromagnetic part;

wherein the energy harvesting device is arranged in such a way that a part of a magnetic flux generated in the power transformer induces an electromotive force in the energy harvesting device;
    wherein the coil comprises a wire wound around a main axis of the coil;
    wherein the coil has an extension along the main axis of the coil which is less than the extension of the winding;
    wherein the energy harvesting device is designed and arranged to power a sensor of the transformer for sensing at least one of temperature, humidity, and pressure; wherein the energy harvesting device has a first end portion attached to the limb and a second end portion attached to the yoke and wherein the limb is connected with one end to the yoke and with a second, opposing end to a further yoke of the core; and
    wherein the ferromagnetic part is attached to the core via at least one permanent magnet.

2. The power transformer of claim 1, wherein the extension of the coil is less than 10% of the extension of the winding.

3. The power transformer of claim 1, wherein the power transformer further comprises a tank filled with oil, wherein the core and the winding are at least partially submerged in the oil.

4. The power transformer of claim 1, wherein the ferromagnetic part includes or consists of laminated silicone steel.

5. The power transformer of claim 1, wherein the coil includes a copper wire.

6. The power transformer of claim 5, wherein the copper wire has a diameter of 0.1 mm or less.

7. The power transformer of claim 1, wherein the permanent magnet includes Neodymium or consists of Neodymium.

8. The power transformer of claim 1, further comprising a tank filled with oil, wherein the core and the winding are at least partially submerged in the oil, and wherein the sensor is disposed within the tank.

9. The power transformer of claim 1, wherein the power transformer is a 50/60 Hz power transformer.

\*  \*  \*  \*  \*